(12) United States Patent
Izumi et al.

(10) Patent No.: US 6,445,758 B1
(45) Date of Patent: Sep. 3, 2002

(54) INTERNAL STRUCTURE OF NUCLEAR REACTOR WITH COOLANT FLOW STABILIZING FACILITY

(75) Inventors: Hajime Izumi; Makoto Nakajima; Chikara Kurimura; Takehiko Tsutsui; Noboru Kubo, all of Hyogo-ken; Mikio Kurihara; Toshio Ichikawa, both of Tokyo, all of (JP)

(73) Assignee: Mitsubishi Heavy Industries, LTD, Tokyo (JP)

( * ) Notice: Subject to any disclaimer, the term of this patent is extended or adjusted under 35 U.S.C. 154(b) by 0 days.

(21) Appl. No.: 09/416,933

(22) Filed: Oct. 13, 1999

(30) Foreign Application Priority Data

Nov. 11, 1998 (JP) .......................................... 10-320751

(51) Int. Cl.⁷ .............................................. G21C 15/02
(52) U.S. Cl. ...................... 376/399; 376/352; 376/361; 376/373; 376/377; 376/385; 376/389; 376/390; 376/395
(58) Field of Search ................................ 376/352, 373, 376/361, 377, 385, 389, 390, 399, 395

(56) References Cited

U.S. PATENT DOCUMENTS

| | | | | |
|---|---|---|---|---|
| 3,623,948 A | * | 11/1971 | Dotsun et al. | 376/352 |
| 3,660,231 A | * | 5/1972 | Fox et al. | 176/56 |
| 3,864,209 A | * | 2/1975 | Tong | 376/399 |
| 3,953,289 A | | 4/1976 | Costes | 176/87 |
| 4,187,147 A | * | 2/1980 | Braun et al. | 376/352 |
| 4,576,784 A | * | 3/1986 | Kobayashi | 376/352 |
| 4,681,728 A | | 7/1987 | Veronesi et al. | 376/209 |
| 4,788,032 A | * | 11/1988 | Baujat et al. | 376/352 |
| 4,788,033 A | * | 11/1988 | Veronesi | 376/353 |
| 4,793,966 A | * | 12/1988 | Veronesi | 376/377 |
| 5,106,573 A | | 4/1992 | Fennem | 376/371 |
| 5,553,107 A | * | 9/1996 | Schwirian et al. | 376/352 |
| 6,173,028 B1 | * | 1/2001 | Ichikawa et al. | 376/377 |

FOREIGN PATENT DOCUMENTS

| | | | | |
|---|---|---|---|---|
| EP | 0241345 | * | 3/1987 | G21C/1/08 |
| EP | 0410624 | | 1/1991 | |
| JP | 08240685 A | * | 9/1996 | G21C/13/00 |
| JP | 09072985 A | | 3/1997 | |
| JP | 09197087 | | 7/1997 | |

* cited by examiner

Primary Examiner—Peter M. Poon
Assistant Examiner—John Richardson
(74) Attorney, Agent, or Firm—Gottlieb, Rackman & Reisman, P.C.

(57) ABSTRACT

Within an upper plenum of a nuclear reactor, a portion of a heated coolant flows radially outward from a central portion of a core barrel (30) towards outlet nozzles (12) in a region of an upper core plate (21) extending outside of an outer periphery of the core along an inner wall of a core barrel (30). Portions of the coolant flows beneath the outlet nozzles (12). Thus, streams of heated coolant flowing in opposite directions may collide with each other. After collision, the flow directions of the heated coolant are changed to flow upward. Due to the collision, the coolant flow behavior becomes complicated and unstable, making it difficult to measure the temperature of the heated coolant with an outlet pipe (42) connected to the outlet nozzle (12). Within an upper plenum (40) defined above a fuel region through which a coolant flows and which is hydraulically communicated with a plurality of outlet nozzles (12) mounted on a side wall of a nuclear reactor vessel (10), short flow stabilizing members (1) each being lower than the outlet nozzle (12) are disposed in the vicinity of a core barrel (30) in an region outside of the fuel region.

18 Claims, 10 Drawing Sheets

INTERNAL STRUCTURE OF NUCLEAR REACTOR WITH COOLANT FLOW STABILIZING FACILITY

BACKGROUND OF THE INVENTION

1. Field of the Invention

The present invention generally relates to the shape and disposition of an internal structural member constituting part of an internal structure and disposed within a pressurized water reactor in which heat exchange takes place between heating members and a coolant. More particularly, the invention is concerned with the shape and disposition of coolant flow stabilizing members disposed within an upper plenum in the vicinity of outlet nozzles for stabilizing the coolant flow in regions located close to the outlet nozzles.

2. Description of the Related Art

In a pressurized water reactor for a power plant, light water serving as a coolant is fed to a reactor core to be heated to a high temperature by heat generated through nuclear fission. The heated light water is taken out and supplied to a steam generator for generating steam which is then fed to a steam system provided separately from a core cooling system to be utilized for rotationally driving a steam turbine and a rotor of an electric generator operatively coupled to the turbine to thereby generate electric energy.

For a better understanding of the invention, background techniques thereof will be reviewed below. FIG. 8 of the accompanying drawings shows an internal structure of a pressurized water reactor typical of nuclear reactors. Referring to the figure, accommodated within a nuclear reactor vessel 10 are reactor core internals, nuclear fuel assemblies, control rods, control rod cluster guide tubes, support members and others. Described in brief, the nuclear reactor vessel 10 is integrally provided with inlet nozzles 11 and outlet nozzles 12 for the reactor coolant which is light water, and a core barrel 30 is suspended vertically within the nuclear reactor vessel 10. The number of the inlet nozzles 11 and the outlet nozzles 12, respectively, coincide with the number of coolant circulation loops which in turn depends on the output power rating of the reactor. Ordinarily, the number of the inlet nozzles 11 and outlet nozzles 12 ranges from two to four each.

By way of example, in a power plant with a large power generation capacity, there are ordinarily provided a plurality of coolant circulation loops in consideration of the capacities of pumps and the steam generator employed in the cooling system as well as restrictions imposed with respect to the disposition thereof within a containment vessel. In other words, the a number of coolant circulation loops installed is determined depending on the output capacity. Since a reactor power plant with a large output capacity is provided with four coolant circulation loops, the number of the inlet nozzles 11 and the outlet nozzles 12 is also four, respectively. The inlet nozzles 11 and the outlet nozzles 12 are installed in the nuclear reactor vessel at predetermined intervals in the circumferential direction thereof. Further, a lower core support plate 32 and a lower core plate 31 are horizontally disposed within the core barrel 30 at a lower portion thereof, respectively. A bottom or lower plenum 41 is defined beneath the lower core support plate 32.

Mounted on the lower core plate 31 are a large number of loaded fuel assemblies 33 which are disposed adjacent to one another to thereby constitute a reactor core. Disposed above the fuel assemblies 33 is an upper core plate 21 which is supported by an upper core support plate 20 by way of upper core support columns 23. The fuel assemblies 33 are pressed downwards by means of the upper core plate 21 so that the fuel assemblies 33 are prevented from being displaced upwards under the influence of buoyancy exerted by the flowing coolant. A plurality of control rod cluster guide tubes 22 are supported at lower ends thereof on the upper surface of the upper core plate 21 by means of supporting pins or the like (not shown). The control rod cluster guide tubes 22 extend upwardly through and beyond the upper core support plate 20. By withdrawing the control rod clusters (not shown either) from the reactor core through the medium of the control rod cluster guide tubes 22 or inserting the control rod clusters into the fuel assemblies 33 of the reactor core through the control rod cluster guide tubes 22, the thermal output of-the reactor core can be adjusted.

The upper core plate 21 and the upper core support plate 20 are interconnected by means of the upper core support columns 23 in order to ensure structurally high strength or robustness. Further, the control rod cluster guide tubes 22 extending through the upper core support plate 20 are fixedly secured to the upper core support plate 20. Thus, the control rod cluster guide tubes 22 are protected against displacement or dislocation in a lateral or transverse direction. Defined between the upper core plate 21 and the upper core support plate 20 interconnected as mentioned above is an upper plenum 40.

Next, description will be directed to the flow or streams of light water employed as the coolant within the nuclear reactor vessel 10 realized in the structure described above. Referring to FIG. 8, light water of low temperature fed to the nuclear reactor vessel 10 by way of the inlet nozzles 11 flows as indicated by the arrows in FIG. 8. More specifically, light water fed to the nuclear reactor vessel 10 through the inlet nozzle 11 flows at first downwardly through an annular space defined between the outer surface of the core barrel 30 and the inner wall of the nuclear reactor vessel 10. The light water is forced to turn upwards within the lower plenum 41. Thereafter, the light water flows into the reactor core after passing through the lower core support plate 32 and the lower core plate 31. Within the reactor core, light water flows upwardly substantially in parallel. In the course of flowing through the reactor core, heat generated by the fuel rods of the fuel assemblies is absorbed by the light water, which results in a temperature increase thereof. After passing through the upper core plate 21, the flowing direction of light water changes to a horizontal or transverse direction. Finally, light water leaves the nuclear reactor vessel 10 through the outlet nozzle 12 to be supplied to a steam generator (not shown) by way of an outlet pipe 42.

More specifically, within the upper plenum 40 defined above the upper core plate 21, light water flows radially outward from a central region of the core to reach the inner wall of the core barrel 30 whereupon the light water flows toward the outlet nozzle 12 along the inner wall of the core barrel 30 in a space surrounding the outer periphery of the core. A portion of the light water flows in one direction along the inner wall of the core barrel 30 while another portion of the light water flows in the other direction opposite to the previous direction along the inner wall of the core barrel 30. Thus, in a space located within the upper plenum near but bellow the outlet nozzle 12, between the streams of light water flowing in opposite directions collide. After the collision, the flow directions of the light water are changed so as to flow upward toward the outlet nozzle 12. Such being the case, the flow of light water in the space located in the vicinity of the outlet nozzle 12 is made unstable due to the above mentioned collision as well as occurrence of turbulence such as swirls or vortexes.

Also, the nuclear reactor vessel 10 of the four-loop reactor plant mentioned previously is implemented in a structure such that two outlet nozzles 12 are disposed adjacent to each other because of the restrictions imposed in view of the requirement for realizing the structure of the primary coolant loop and the reactor containment vessel in a reduced size and the like, as can be seen in FIGS. 9 and 10 of the accompanying drawings. Consequently, some of the light water flowing along the inner wall of the core barrel 30 tends to flow transversely beneath the outlets of the outlet nozzles 12, and will also collide with the coolant streams in a region between the adjacent outlet nozzles 12. After the collision, light water is forced to change its flow directions so as to flow upwardly. However, due to occurrence of turbulence such as swirls or vortexes and differences in the flow rate between the two loops, light water can rarely flow uniformly into two loops through the adjacent outlet nozzles 12, respectively. Thus, an unstable water stagnation region unavoidably occurs in the vicinity of the outlet nozzles 12. As a result of this, the behavior of light water flowing into the outlet nozzles 12 becomes complicated and unstable.

It should further be added that under the influence of temperature distribution in the fuel region, a stratified flow distribution within the upper plenum 40 is formed such that the coolant of relatively high temperature flows at a relatively high level while the coolant of relatively low temperature flows at a relatively low level. In other words, a plurality of stratified coolant flows of different temperatures are produced within the upper plenum 40, as viewed in the vertical direction. Such being the case, the coolant flowing on or in proximity to the upper surface of the upper core plate 21 along the inner wall of the core barrel 30 is at a relatively low temperature.

For the reasons mentioned above, the unstable coolant flow of a relatively low temperature brings about fluctuations or variations in the temperature of the coolant flowing through the outlet pipe 42 connected to the outlet nozzle 12. Consequently, this can easily become an obstacle when mean temperature of the nuclear reactor is measured by measuring the temperature of the coolant flowing through the outlet pipe 42 connected to the outlet nozzle 12.

SUMMARY OF THE INVENTION

In light of the state of the art described above, it is an object of the present invention to provide an internal structure disposed within a nuclear reactor vessel, the structure including an internal structural member configured and disposed so as to be capable of stabilizing the coolant flow in a region located near or close to an outlet nozzle, to thereby eliminate or mitigate difficulties which may otherwise be involved in the temperature measurement of the coolant flowing through the outlet pipe.

In view of the above and other objects which will become apparent as the description proceeds, the present invention is directed to an internal structure of a nuclear reactor including an upper plenum which is defined above a fuel region through which a heated coolant flows and which is hydraulically communicated with a plurality of outlet nozzles mounted on a side wall of a nuclear reactor vessel.

According to a general aspect of the present invention, it is proposed that in the internal structure of the nuclear reactor mentioned above, at least a short flow stabilizing member which is lower than the outlet nozzle is disposed in the vicinity of the core barrel in a region outside of the fuel region.

By virtue of the arrangement described above, the currents or streams of the heated coolant flowing in the vicinity of the core barrel at a level lower than the outlet nozzle within the upper plenum are smoothly guided upwards by the short flow stabilizing member without undergoing collision. Thus, unstable coolant flow in the vicinity of the outlet nozzle can be avoided. Accordingly, temperature fluctuation of the heated coolant flowing through the outlet pipe connected to the outlet nozzle can be suppressed, whereby the average or mean temperature measurement mentioned previously can be carried out with enhanced stability and reliability. Moreover, since the short flow stabilizing member is lower than the outlet nozzle, the hydrodynamic load acting on the flow stabilizing member can be reduced. Thus, the soundness of the reactor internal structure can be ensured.

In a preferred mode for carrying out the present invention, the short flow stabilizing member may be disposed in the vicinity of an outlet of the outlet nozzle such that a top end of the short flow stabilizing member is positioned beneath the outlet of the outlet nozzle. By virtue of this arrangement, the stream or currents of the heated coolant flowing in the vicinity of the core barrel at a lower level within the upper plenum are guided by the flow stabilizing member toward the outlet nozzle from the lower side thereof, whereby the flow of the heated coolant entering the outlet nozzle can further be stabilized.

In another preferred mode for carrying out the invention, the short flow stabilizing member may be disposed at a position directly underneath a center portion of the outlet of the outlet nozzle. With such an arrangement, the stream of the heated coolant flowing within the upper plenum in the vicinity of the core barrel at a lower level can be guided uniformly into the outlet nozzle at both sides of the short flow stabilizing member without colliding. In this way, the flow of the heated coolant can further be stabilized.

Further, the teachings of the present invention can equally be applied to a nuclear reactor for a four-loop plant as well. In that case, the short flow stabilizing members may be disposed at positions substantially midway between two adjacent outlet nozzles. With the arrangement in which the short flow stabilizing members are disposed between the adjacent outlet nozzles in the reactor for a four-loop plant, the streams of the heated coolant flowing within the upper plenum in the vicinity of the core barrel at a lower level can be prevented from colliding, and thus the coolant can flow into the outlet nozzles of every loop with enhanced stability.

Moreover, it should be added that the length of the flow stabilizing member should preferably be selected when the mounted, the top end thereof is positioned at a height level within a range of from a position midway between the upper surface of the upper core plate and the lowermost portion of the outlet of the outlet nozzle to a position level lower than the lowermost portion of the outlet. With the dimensions of the short flow stabilizing member mentioned above, there is essentially no possibility that the heated coolant flowing toward the outlet nozzle will be blocked. Moreover, a hydrodynamic load acting on the short flow stabilizing member can be reduced. Thus, the soundness of the internal structure of the reactor can be ensured. Further, because of the short length of the flow stabilizing member, handling for mounting can be facilitated. Thus, the short flow stabilizing member can be employed in existing nuclear reactors as well.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
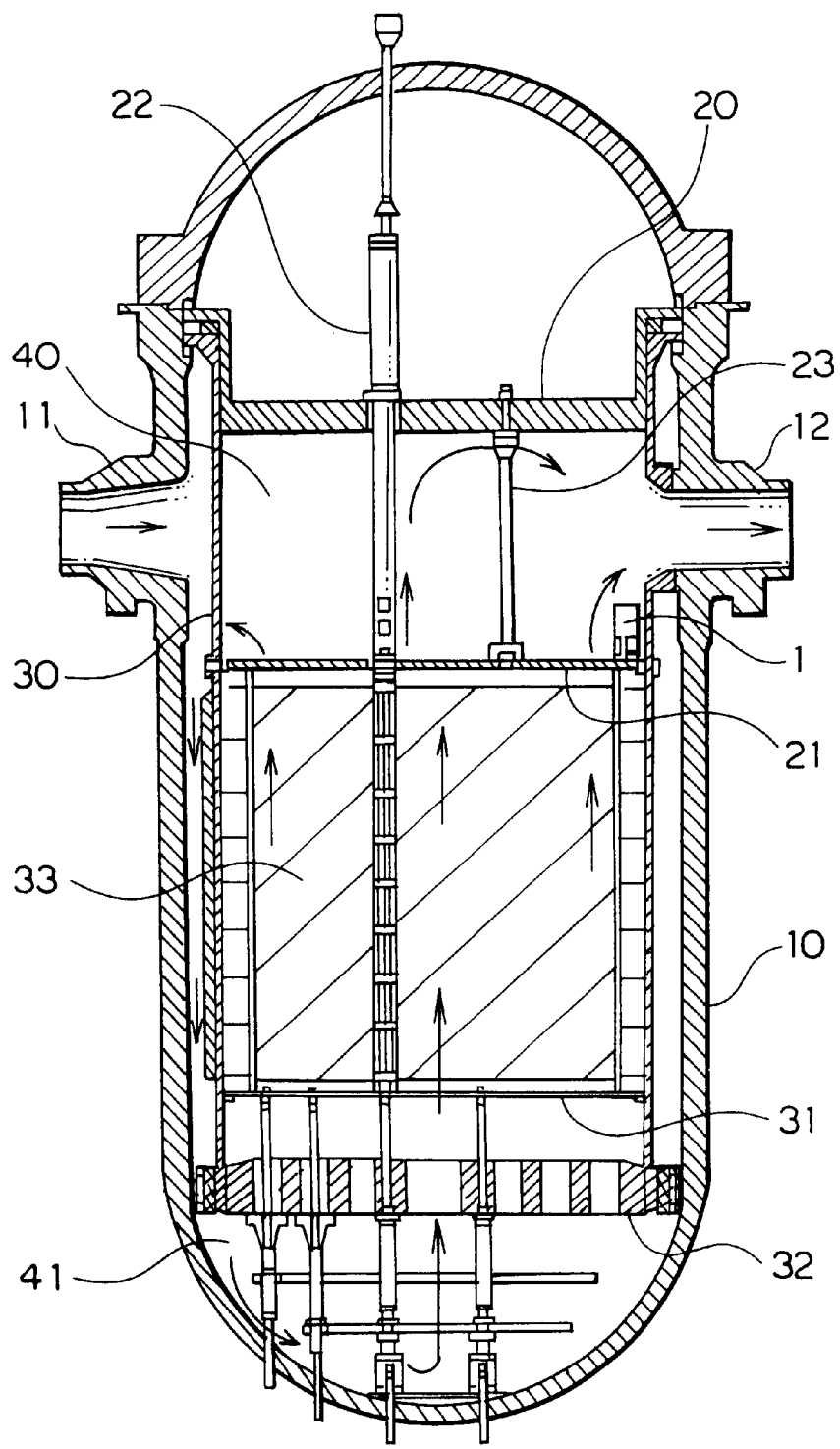
FIG. 1 is a vertical sectional view showing generally and schematically an essential portion of a pressurized water reactor according to a first embodiment of the present invention with several components being omitted from illustration.

The present invention will be described in detail in conjunction with what are presently considered as preferred or typical embodiments thereof with reference to the drawings. In the following description, like reference characters designate like or corresponding parts throughout the drawings. Also in the following description, it is to be understood that such terms as "right", "left", "upper", "lower" and the like are words of convenience and are not to be construed as limiting terms.

Embodiment 1

FIG. 1 is a sectional view showing generally and schematically a structure of a pressurized water reactor equipped with flow stabilizing members according to a first embodiment of the present invention. In this figure, some components are omitted from illustration. It should first be mentioned that in the pressurized water reactor now under consideration, the internal structure or internals of the reactor are, for the most part, essentially the same as the conventional nuclear reactor described hereinbefore. Accordingly, repetitive description thereof will be unnecessary. The pressurized water reactor according to the instant embodiment of the invention differs from conventional ones in that a short member 1 serving as a flow stabilizing member is mounted within the upper plenum 40 in an outer region extending outside of the fuel region along the inner wall of the core barrel 30 at a position lower than the outlet nozzle 12. In this conjunction, the phrase "outer region extending outside of the fuel region" means a region on the upper surface of the upper core plate 21 extending outside of the fuel assembly region 33 (indicated by a double-dotted line in FIG. 2) within the upper plenum 40 the outer periphery thereof corresponding to that of the core. Further, the phrase "at a position lower than the outlet nozzle 12" means that the top end of the flow stabilizing member 1 in the mounted state within upper plenum 40 is lower than a lowermost portion of the bore of the outlet nozzle 12.

Embodiment 2

Figure 2:
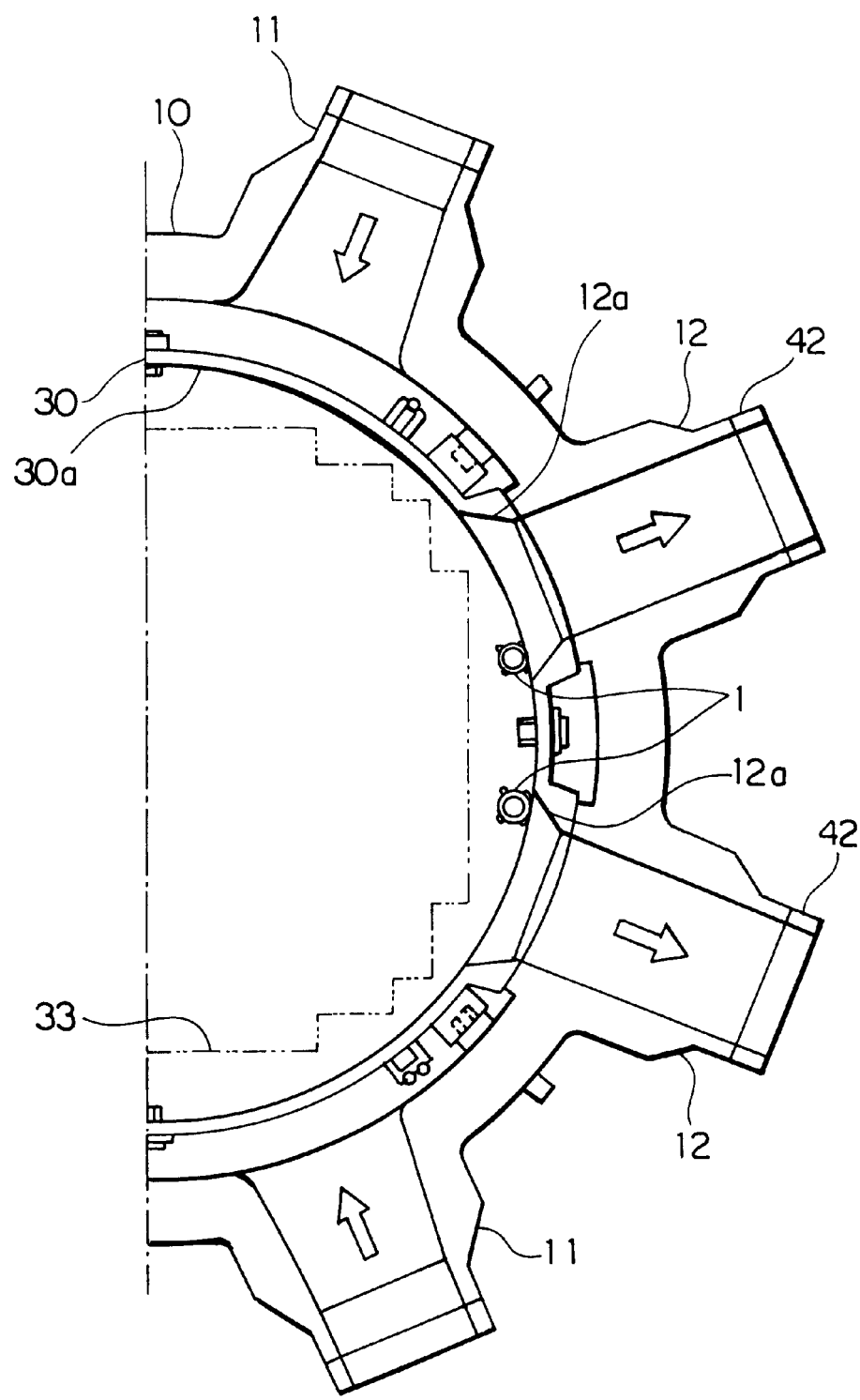
FIG. 2 is a schematic top plan view showing half of an essential portion of a nuclear reactor for a four-loop plant in which short flow stabilizing members are installed according to a second embodiment of the present invention.
Figure 3:
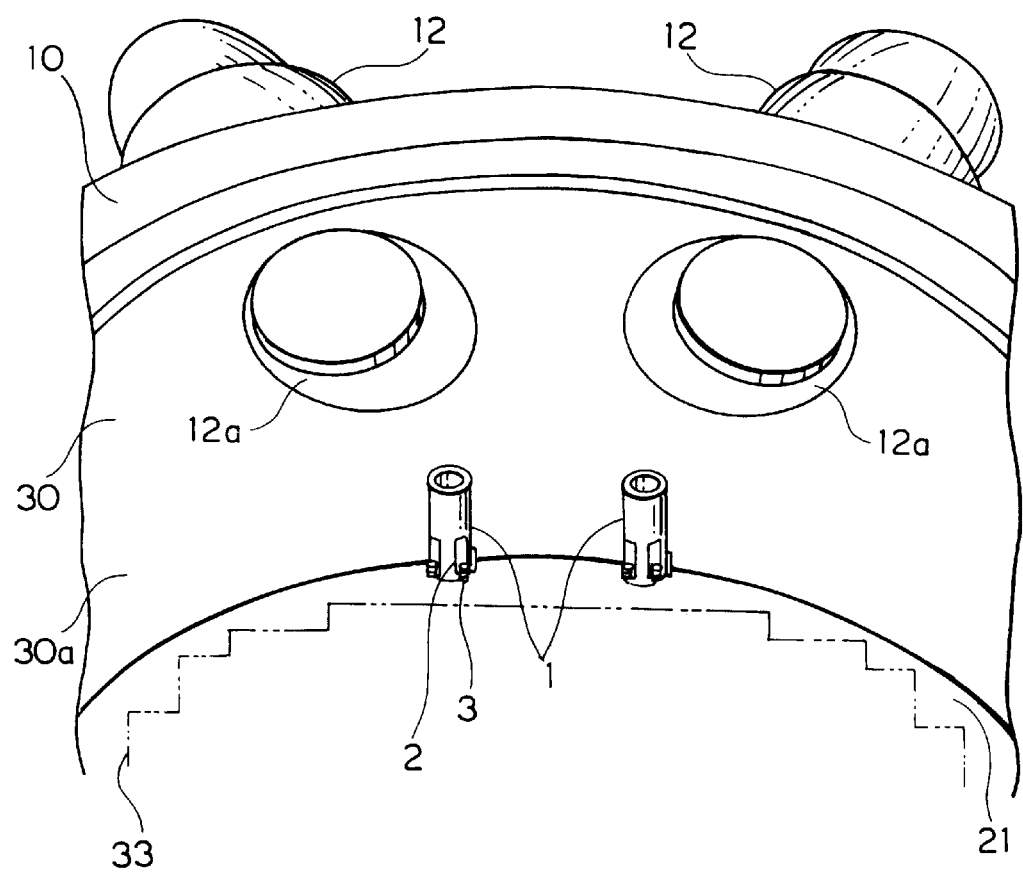
FIG. 3 is a perspective view showing a region of the nuclear reactor vessel in which the short flow stabilizing members are mounted in the vicinity of adjacent outlet nozzles according to the second embodiment of the invention.

Next, referring to FIGS. 2 and 3, description will be made of a second embodiment of the present invention which is directed to a nuclear reactor for a four-loop plant in which the short members 1 according to the invention are employed as the flow stabilizing members. FIG. 2 is a schematic top plan view showing half of an essential portion of the nuclear reactor, and FIG. 3 is a perspective view showing a region where the short members are mounted in the vicinity of the outlet nozzles. As can be seen from the figures, the short members 1 serving as the flow stabilizing members, respectively, are disposed in the outer region extending outside of the fuel region in the proximity of the inner wall of the core barrel 30. More specifically, the short member 1 is mounted on the upper core plate 21 within the upper plenum 40 in a region extending or located outside of the fuel assembly region 33 (indicated by a double-dotted broken line) at a position close to the inner wall 30a of the core barrel 30. It should, however, be noted that in practical applications, the short member 1 is mounted at a certain distance from the inner wall 30a of the core barrel 30 in consideration of the thermal expansion of the short member 1. Furthermore, the short member 1 is mounted so that the top end thereof is positioned lower than the lowermost portion of a coolant outlet 12a of the outlet nozzle 12. This arrangement is effective for stabilizing the flow of the coolant within the upper plenum 40 in the regions located below the outlets 12a of outlet nozzles 12 as well as for reducing the hydrodynamic load acting on the short members 1.

The length of the flow stabilizing member 1 is selected so that the top end thereof is positioned lower than the lowermost portion of the outlet 12a of the outlet nozzle 12 when the flow stabilizing member 1 is mounted on the upper core plate 21. More specifically, the flow stabilizing member 1 should preferably be dimensioned so that the length thereof falls within a range of from a position midway between the upper surface of the upper core plate 21 and the lowermost portion of the outlet 12a of the outlet nozzle 12 to a position lower than the lowermost portion of the outlet 12a. If the top end of the flow stabilizing member 1 is positioned higher than the lowermost portion of the outlet 12a of the outlet nozzle 12, the flow resistance of the coolant flowing within the upper plenum 40 toward the outlet nozzle 12 from a center portion of the reactor core will increase, and the hydrodynamic load acting on the short member 1 will increase as well to ultimately adversely effect the mechanical or structural strength of the internal structure of the reactor. On the other hand, if the length of the short member 1 is excessively short, it is difficult to stabilize the flow of the coolant along the inner wall 30a of the core barrel 30. For these reasons, the flow stabilizing member 1 should be so dimensioned that the length thereof falls within the range defined above. Furthermore, installation of the flow stabilizing member 1 can be realized by securing a bracket 2 which is fixed to the flow stabilizing member 1 onto the upper core plate 21 by means of bolts 3. The short length and ease of mounting of the flow stabilizing members on the upper core plate 21 can facilitate installation of the flow stabilizing members in existing equipment as well.

Figure 4:
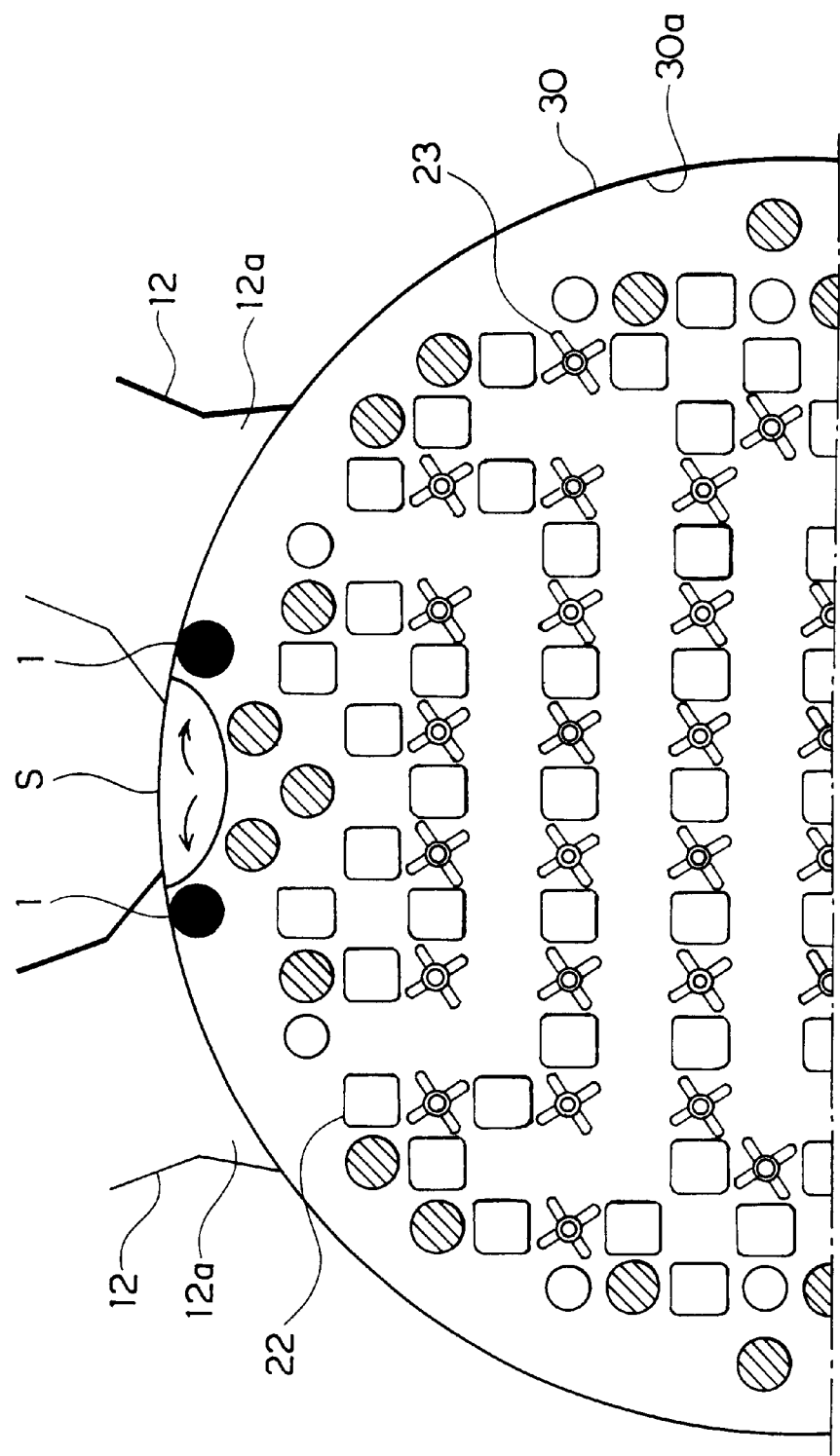
FIG. 4 is a schematic top plan view showing half of the nuclear reactor for illustrating disposition of internal structure members within an upper plenum together with flow behavior of the coolant in the vicinity of the outlet nozzles in the four-loop plant reactor according to the second embodiment of the invention.
Figure 5:
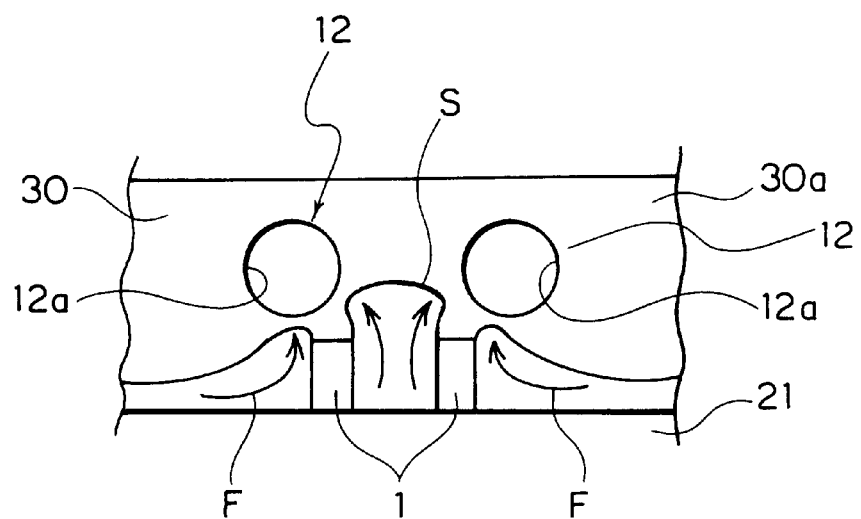
FIG. 5 is a schematic side view for illustrating behavior of the coolant flowing in the vicinity of the adjacent outlet nozzles in the reactor according to the second embodiment of the present invention.

Next, with reference to FIGS. 4 and 5, description will be made of the flow behavior of the coolant in the vicinity of the outlet nozzles 12 in the structure where the short members 1 are installed within the upper plenum in the manner described above. FIG. 4 is a schematic top plan view of half of a nuclear reactor illustrating disposition of the internal structural members within the upper plenum 40 together with the flow of the coolant in the vicinity of the outlet nozzles 12, and FIG. 5 is a schematic side view showing behavior of the coolant flowing in the vicinity of adjacent outlet nozzles 12. As can be seen from the figures, the coolant flows radially outward along the upper surface of the upper core plate 21 from a center region of the core to reach the inner wall 30a of the core barrel 30, whereupon the coolant flows toward the outlet nozzles 12 along the inner wall 30a of the core barrel 30 in the region outside of the outer periphery of the core. Here, a portion of the coolant or light water flowing along the inner wall 30a of the core barrel 30 flows below the outlet nozzle 12. Accordingly, when the short members 1 serving as the flow stabilizing members are not disposed, as in conventional reactors, streams of the coolant flowing in opposite directions collide with each other in a region between the adjacent outlet nozzles 12.

In contrast, by disposing the short flow stabilizing members 1 according to the instant embodiment of the invention lower than the outlet nozzles 12, respectively, as mentioned previously, streams F of the coolant along the inner wall 30a can flow smoothly into the outlets 12a of the outlet nozzles 12 under the guiding action of the flow stabilizing members 1, as can be seen in FIG. 5. Further, a stagnation region S occurring between the flow stabilizing members 1 is decreased and the coolant in the stagnation region S is forced to smoothly flow upward into the outlet 12a of the outlet nozzle 12 under the constraining action exerted by the two flow stabilizing members 1. Accordingly, the coolant flow entering the outlet nozzle 12 can stabilized, as a result of which temperature fluctuation of the coolant flowing through the outlet pipe 42 connected to the outlet nozzle 12 can be effectively suppressed. Furthermore, measurement of variation or fluctuation of the temperature within the outlet pipe 42 connected to the outlet nozzle 12 in a demonstration test simulating flow behavior of the outlet nozzle 12 and upper plenum 40 show that temperature fluctuation in the outlet pipe 42 of the reactor equipped with the flow stabilizing members 1 can be suppressed or reduced by approximately half when compared with the structure in which no flow stabilizing members 1 are employed.

Furthermore, the flow stabilizing member 1 according to the instant embodiment of the invention is implemented in a hollow cylindrical shape in view of the fact that the hollow cylindrical flow stabilizing member 1 can be manufactured with light weight and relatively low cost. However, the present invention is not restricted to a flow stabilizing member with such a shape. As long as the stream F of the coolant flowing along the inner wall 30a of the core barrel 30 can be stabilized, as described above, flow stabilizing members 1 with different structures such as a solid cylindrical or columnar structure, a plate-like structure, a prism structure or the like can be employed as well.

Embodiment 3

Figure 6:
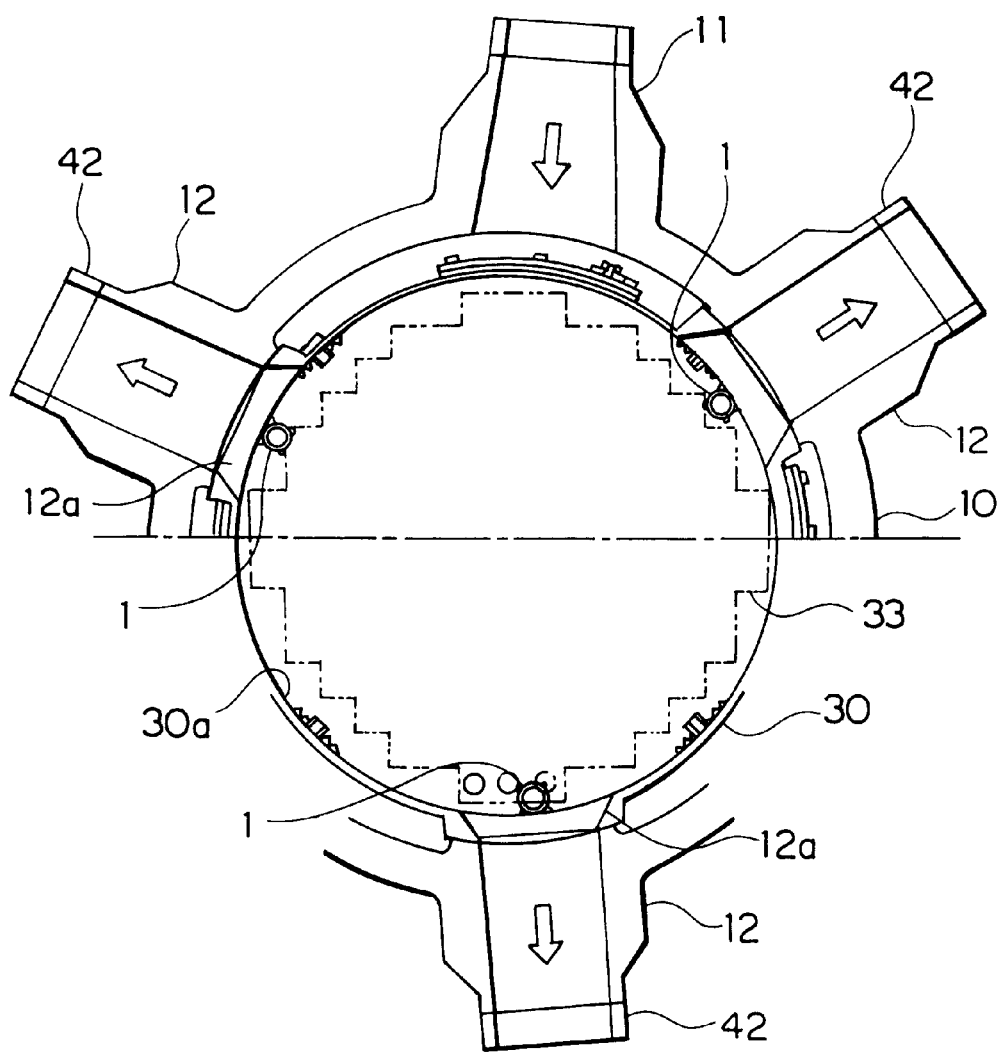
FIG. 6 is a schematic top plan view showing an essential portion of a nuclear reactor for a three-loop plant according to a third embodiment of the present invention, wherein several components are omitted from illustration.
Figure 7:
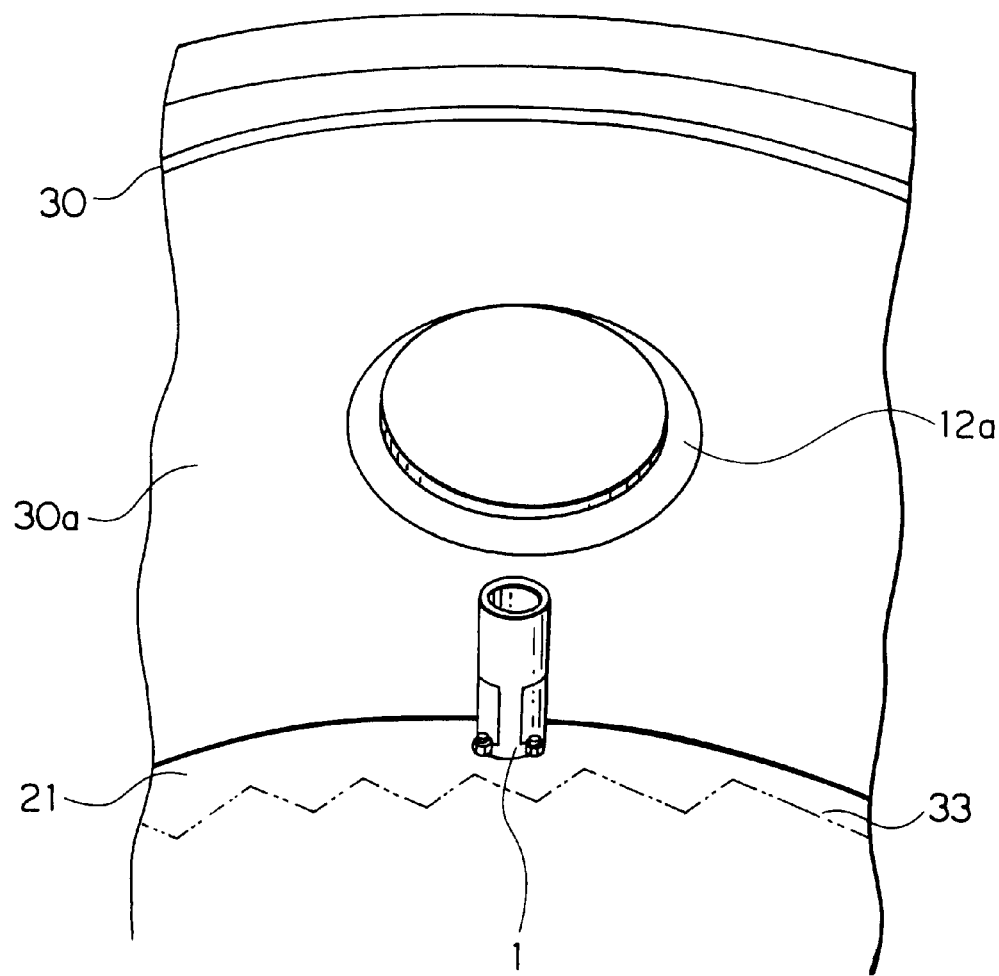
FIG. 7 is a perspective view showing a region in the vicinity of an outlet nozzle in the nuclear reactor according to a third embodiment of the invention.
Figure 8:
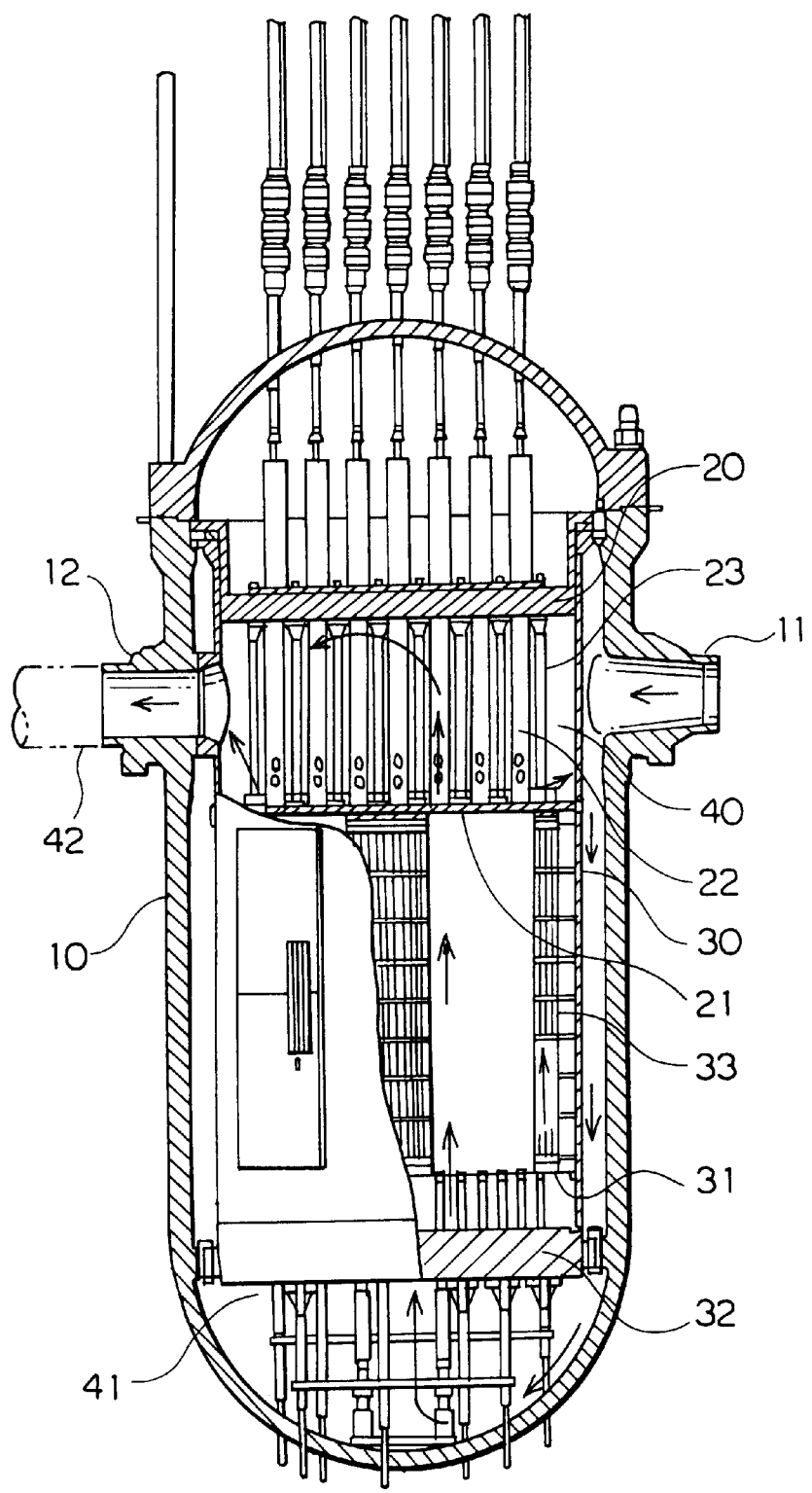
FIG. 8 is a vertical sectional view showing schematically an essential portion of a typical conventional pressurized water reactors.
Figure 9:
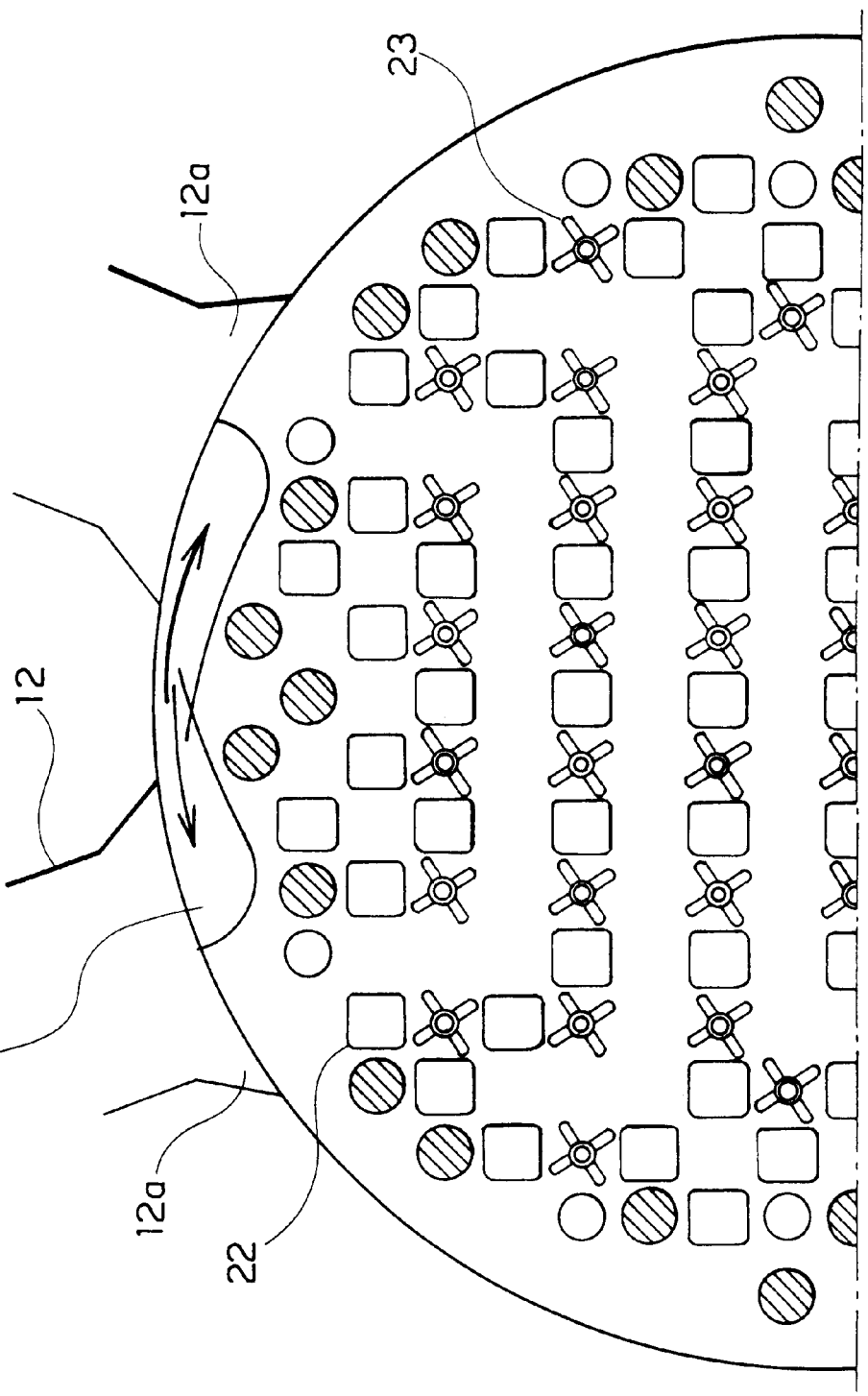
FIG. 9 is a schematic top plan view showing half of the nuclear reactor for illustrating disposition of internal structure members within an upper plenum together with the flow behavior of the coolant in the vicinity of the outlet nozzles in the existing four-loop pressurized water reactor.
Figure 10:
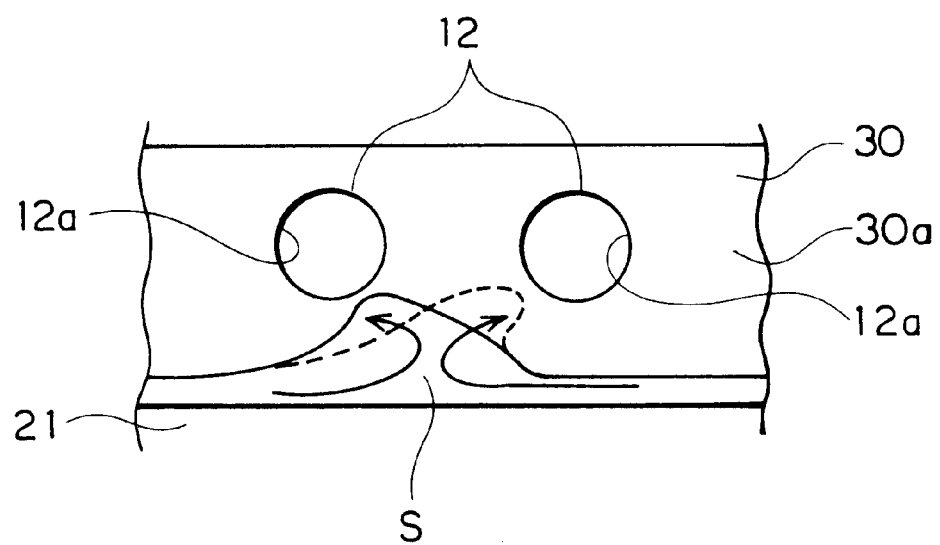
FIG. 10 is a schematic side view for illustrating behavior of the coolant flowing in the vicinity of the adjacent outlet nozzles in the conventional four-loop pressurized water reactor.

A third embodiment of the present invention is directed to application of the flow stabilizing member to a nuclear reactor for a two- or three-loop plant. First, it is to be noted that the disposition of the flow stabilizing member(s) according to the instant embodiment of the invention can be equally adopted in the four-loop reactor plant described above. FIG. 6 is a schematic top plan view showing an essential portion of the nuclear reactor for a three-loop plant, wherein some components are omitted from illustration, and FIG. 7 is a perspective view showing a region of the upper plenum in the vicinity of the outlet nozzles 12. Here, it should be mentioned that the shape and the length of the flow stabilizing member 1 are essentially the same as those of the flow stabilizing member described hereinbefore. Accordingly, repeated description thereof will be unnecessary. The third embodiment of the invention differs from the preceding embodiments in that the outlet nozzles 12 are not disposed adjacent to each other. The flow stabilizing member 1 according to the third embodiment of the invention is disposed directly underneath a central portion of the outlet 12a of the outlet nozzle 12 in close proximity to the inner wall 30a of the core barrel 30. As mentioned hereinbefore, disposition of the flow stabilizing member in close proximity to the inner wall 30a of the core barrel 30 is very effective for reducing the hydrodynamic load applied to the flow stabilizing member 1 and also stabilizes flow of the coolant F in a space within the upper plenum 40 below the outlet nozzle 12.

Now, description will turn to the flow behavior of the coolant in the vicinity of the outlet nozzle 12 in the reactor equipped with the flow stabilizing members 1 according to the third embodiment of the invention. Portions of the coolant flowing opposite to one another along the inner wall 30a of the core barrel 30 tend to collide with each other beneath the outlet nozzle 12. However, because the flow stabilizing member 1 is disposed underneath the center portion of the bore of the outlet nozzle 12, the streams of the coolant flowing along the inner wall 30a of the core barrel 30 are forced to flow upward uniformly at both sides of the flow stabilizing member owing to the flow guiding action thereof. Thus, the coolant can flow smoothly into the outlet 12a defined by the outlet nozzle 12. In other words, collision of the coolant streams flowing opposite to one another along the inner wall 30a beneath the outlet nozzle 12 can be effectively suppressed, whereby the stream of the coolant flowing into the outlet nozzle 12 can be stabilized. Consequently, temperature fluctuation within the outlet pipe 42 connected to the outlet nozzle 12 can be suppressed.

Although it has been described that the flow stabilizing member 1 employed in the instant embodiment of the invention is installed underneath a center portion of the outlet of the outlet nozzle 12, it goes without saying that the flow stabilizing member 1 can be mounted at practically any position as long as the mounting position of the flow stabilizing member is covered by a region extending below and across the outlet nozzle 12. What is important is to avoid collision of the coolant streams in the vicinity of the region beneath the outlet nozzle 12, because then the flow of the coolant flowing into the outlet nozzle 12 can be stabilized. Accordingly, when it is impossible to mount the flow stabilizing member underneath the central portion of the outlet nozzle in view of structural limitations, then the flow stabilizing member 1 can be mounted at a position more or less deviated from a position underneath the center of the bore of the outlet nozzle 12 as long as the deviated position lies within the region extending beneath and across the outlet nozzle 12. Thus, the present invention can be applied to existing nuclear reactors without any appreciable difficulty.

In the foregoing, exemplary embodiments of the present invention which are considered preferable at present and other alternative embodiments have been described in detail with reference to the drawings. It should, however, be noted that the present invention is not restricted to these embodiments and other variations and modifications can be easily conceived and realized by those skilled in the art without departing from the spirit and scope of the present invention.

What is claimed is:

1. An internal structure of a nuclear reactor including an upper plenum which is defined above a fuel region through which a current of coolant flows and which is hydraulically communicated with a plurality of outlet nozzles mounted on a side wall of a nuclear reactor vessel with the current of coolant flow being separated into streams which collide as said fluid flows to said outlet nozzles, and provided with a flow stabilizing member being lower than one of said outlet nozzles, said member being supported on or above a portion of the upper core plate that is not perforated for fluid flow, disposed in the vicinity of a core barrel in a region outside of said fuel region and positioned to separate said streams thereby preventing the streams from colliding to suppress temperature fluctuations of said coolant flow.

2. An internal structure of a nuclear reactor according to claim 1, wherein said flow stabilizing member is disposed beneath an outlet of said outlet nozzle.

3. An internal structure of a nuclear reactor according to claim 2, wherein said flow stabilizing member is disposed directly underneath a center portion of said outlet of said outlet nozzle.

4. An internal structure of a nuclear reactor including an upper plenum which is defined above a fuel region through which a coolant flows and which is hydraulically communicated with a plurality of outlet nozzles mounted on a side wall of a nuclear reactor vessel, said upper plenum being shaped to define several separate streams for said coolant which collide; and a flow stabilizing member being lower than said outlet nozzle, said member being supported on or above a portion of the upper core plate that is not perforated for fluid flow, disposed in the vicinity of a core barrel in a region outside of said fuel region, wherein said flow stabilizing member is disposed at positions midway between said two adjacent outlet nozzles to prevent said separate streams from colliding to prevent temperature fluctuations of said coolant.

5. An internal structure of a nuclear reactor according to claim 4, wherein said flow stabilizing member is dimensioned so that a top end thereof is positioned at a height level within a range from a position midway between an upper surface of said upper core plate and a lowermost portion of said outlet of said outlet nozzle to a position lower than said lowermost portion of said outlet.

6. An internal structure of a nuclear reactor including an upper plenum which is defined above a fuel region through which a coolant flows and which is hydraulically communicated with a plurality of outlet nozzles mounted on a side wall of a nuclear reactor vessel, and provided with a flow stabilizing member being lower than said outlet nozzles, said coolant flowing along at least two streams which collide toward said outlet nozzles, said member being supported on or above a portion of the upper core plate that is not perforated for fluid flow, disposed in the vicinity of a core barrel in a region outside of said fuel region, wherein said flow stabilizing member is disposed directly underneath a center portion of said outlet of said outlet nozzle and dimensioned so that a top end thereof is positioned at a height level within a range from a position midway between an upper surface of said upper core plate and a lowermost portion of said outlet of said outlet nozzle to a position lower than said lowermost portion of said outlet to thereby prevent said streams from colliding.

7. An internal structure of a nuclear reactor including an upper plenum which is defined above a fuel region through which a current of coolant flows and which is hydraulically communicated with a plurality of outlet nozzles mounted on a side wall of a nuclear reactor vessel with the current of coolant flow being separated into streams which collide as said fluid flows to said outlet nozzles, and provided with a flow stabilizing member being lower than one of said outlet nozzles, said member being constructed to impede fluid flow therethrough, disposed in the vicinity of a core barrel in a region outside of said fuel region and positioned to separate said streams thereby preventing the streams from colliding to suppress temperature fluctuations of said coolant flow.

8. An internal structure of a nuclear reactor according to claim 7, wherein said flow stabilizing member is disposed beneath an outlet of said outlet nozzle.

9. An internal structure of a nuclear reactor according to claim 8, wherein said flow stabilizing member is disposed directly underneath a center portion of said outlet of said outlet nozzle.

10. The internal structure of a nuclear reactor according to claim 9 wherein said flow stabilizing member is solid so as to prevent the flow of liquid therethrough.

11. The internal structure of a nuclear reactor according to claim 8 wherein said flow stabilizing member is solid so as to prevent the flow of liquid therethrough.

12. The internal structure of a nuclear reactor according to claim 7 wherein said flow stabilizing member is solid so as to prevent the flow of liquid therethrough.

13. An internal structure of a nuclear reactor including an upper plenum which is defined above a fuel region through which a coolant flows and which is hydraulically communicated with a plurality of outlet nozzles mounted on a side wall of a nuclear reactor vessel, said upper plenum being shaped to define several separate streams for said coolant which collide; and a flow stabilizing member being lower than said outlet nozzle, said member being constructed to impede fluid flow therethrough, disposed in the vicinity of a core barrel in a region outside of said fuel region, wherein said flow stabilizing member is disposed at positions midway between said two adjacent outlet nozzles to prevent said separate streams from colliding to prevent temperature fluctuations of said coolant.

14. An internal structure of a nuclear reactor according to claim 13, wherein said flow stabilizing member is dimensioned so that a top end thereof is positioned at a height level within a range from a position midway between an upper surface of said upper core plate and a lowermost portion of said outlet of said outlet nozzle to a position lower than said lowermost portion of said outlet.

15. The internal structure of a nuclear reactor according to claim 14 wherein said flow stabilizing member is solid so as to prevent the flow of liquid therethrough.

16. The internal structure of a nuclear reactor according to claim 13 wherein said flow stabilizing member is solid so as to prevent the flow of liquid therethrough.

17. An internal structure of a nuclear reactor including an upper plenum which is defined above a fuel region through which a coolant flows and which is hydraulically communicated with a plurality of outlet nozzles mounted on a side wall of a nuclear reactor vessel, and provided with a flow stabilizing member being lower than said outlet nozzles, said coolant flowing along at least two streams which collide toward said outlet nozzles, said member being constructed to impede fluid flow therethrough, disposed in the vicinity of a core barrel in a region outside of said fuel region, wherein said flow stabilizing member is disposed directly underneath a center portion of said outlet of said outlet nozzle and dimensioned so that a top end thereof is positioned at a height level within a range from a position midway between an upper surface of said upper core plate and a lowermost portion of said outlet of said outlet nozzle to a position lower than said lowermost portion of said outlet to thereby prevent said streams from colliding.

18. The internal structure of a nuclear reactor according to claim 17 wherein said flow stabilizing member is solid so as to prevent the flow of liquid therethrough.

* * * * *